Aug. 14, 1934.   K. C. MONROE   1,970,181
BACK PRESSURE CONTROL MECHANISM FOR MACHINE TOOLS
Filed July 9, 1932
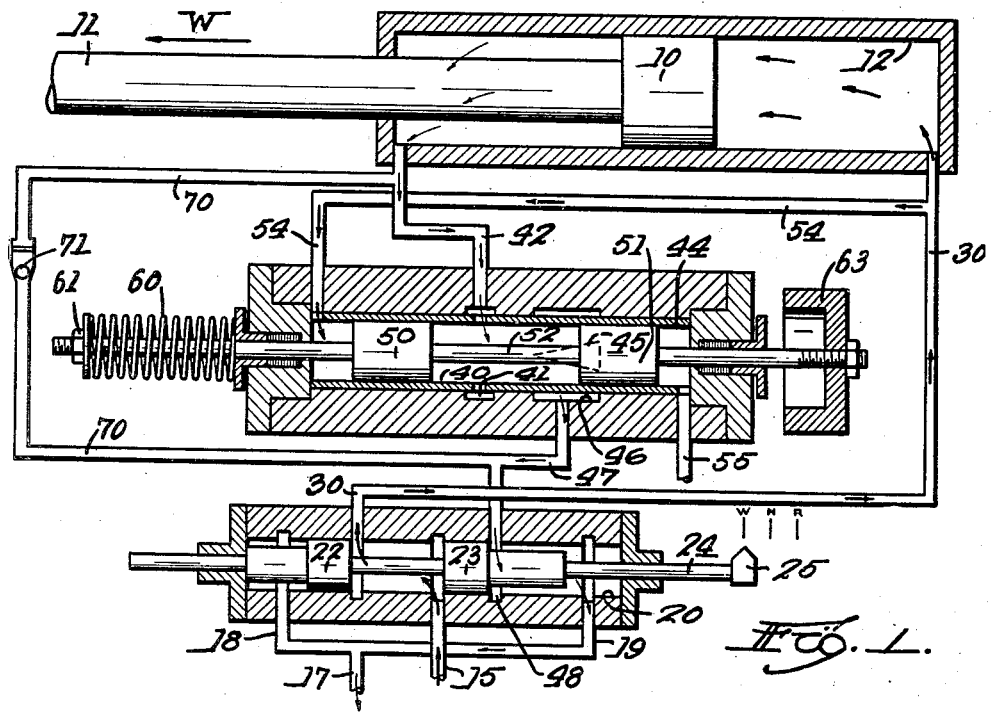
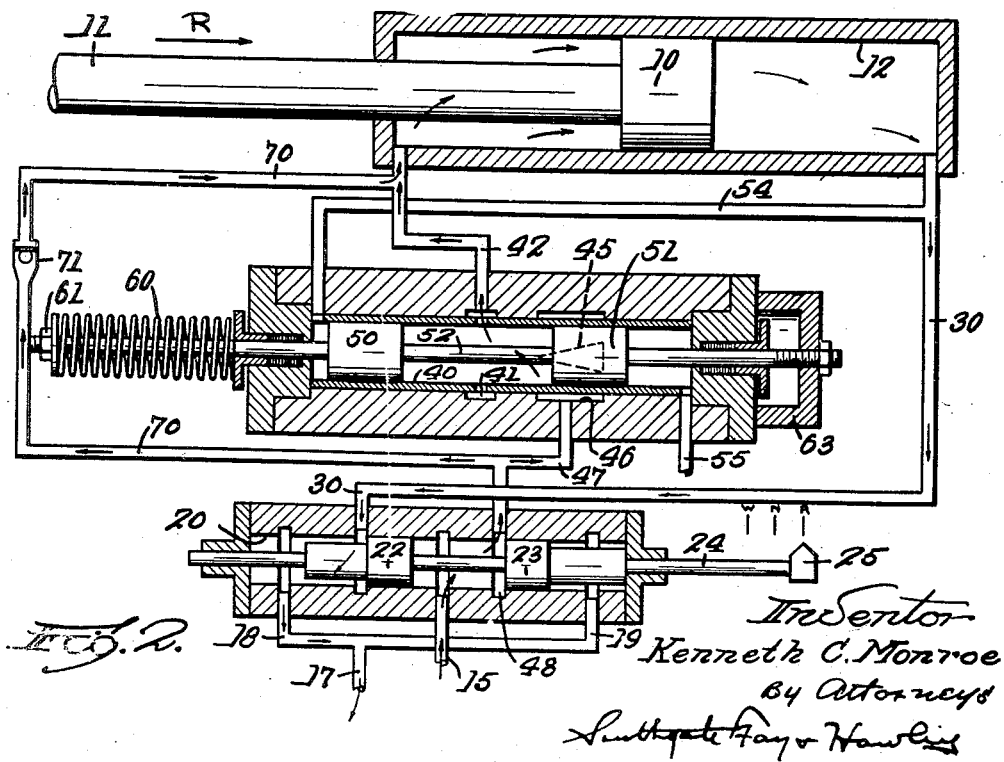

Patented Aug. 14, 1934

1,970,181

UNITED STATES PATENT OFFICE 1,970,181

BACK PRESSURE CONTROL MECHANISM FOR MACHINE TOOLS

Kenneth C. Monroe, Hudson, Mass., assignor to The Lapointe Machine Tool Company, Hudson, Mass., a corporation of Maine Application July 9, 1932, Serial No. 621,663

2 Claims. (Cl. 121—45)

This invention relates to machine tools in which a member is moved in one direction for a working stroke and in the opposite direction for an idle or return stroke.

The invention is applicable to many different kinds of machine tools, but is particularly useful when a machine tool, such as a planer, is operated at slow speed. Under these conditions, the reciprocating member, as a planer table, has a strong tendency to move irregularly or jump forward, and thus produce unsatisfactory work.

It is the general object of my invention to provide mechanism by which a substantial back pressure will be maintained during the working stroke, which back pressure, however, will not operate during the idle return movement of the reciprocated member.

A further object is to provide a back pressure so controlled that the back pressure largely equalizes variations in tool resistance or load.

My invention further relates to arrangements and combinations of parts which will be hereinafter described and more particularly pointed out in the appended claims.

A preferred form of the invention is shown in the drawing, in which

Fig. 1 is a sectional side elevation of hydraulic actuating mechanism including my improved back pressure control, and Fig. 2 is a view similar to Fig. 1 but showing the position of the parts during the return stroke.

Referring to the drawing, I have shown a piston 10 having a piston rod 11 adapted to be connected to a reciprocated element in a machine tool, such as a planer table. The piston 10 is slidable in a main cylinder 12 and moves to the left on the working stroke as indicated in Fig. 1, and to the right on the return stroke as indicated in Fig. 2.

Fluid under pressure is supplied through a pipe 15 from any suitable source, and fluid discharged from the hydraulic mechanism is returned through an exhaust pipe 17 having branches 18 and 19. The pipes 15, 18 and 19 are connected to annular ports in a reversing valve cylinder 20.

A piston valve is slidable in the cylinder 20 and comprises spaced piston elements 22 and 23 mounted on a piston rod 24 which may be manually or automatically shifted at the end of the working stroke by any usual and suitable mechanism. On the drawing an index 25 is provided to indicate the position of the reversing valve.

When the reversing valve is in the working position shown in Fig. 1, fluid under pressure is supplied from the pipe 15 through the cylinder 20 to the pipe 30 which leads to the right-hand end of the main cylinder 12, and when the reversing valve is in the return position shown in Fig. 2, the pipe 30 is connected through the cylinder 20 and branch pipe 18 to the exhaust pipe 17.

My improved back-pressure control mechanism comprises a cylinder 40 having an annular port and passage 41 connected by a pipe 42 to the left-hand end of the main cylinder 12. The cylinder 40 is provided with a sleeve or bushing 44 having a plurality of triangular ports 45 opening into an annular passage 46 connected by a pipe 47 to an annular port 48 in the reversing cylinder 20.

An automatic piston valve is provided for the back-pressure control mechanism and is formed in two parts 50 and 51 mounted on a piston rod 52 and slidable in the cylinder 40.

A branch pipe 54 is connected at one end to the pipe 30 previously described, and at the other end opens into that portion of the cylinder 40 between the piston element 50 and the left-hand end of the cylinder. The corresponding cylinder space at the right-hand end of the cylinder 40 is continuously vented or connected to the exhaust through a pipe 55.

A spring 60 is mounted on one end of the piston rod 52 and engages a nut 61 threaded thereon, while the opposite end of the piston rod is provided with a stop 63 adjustably mounted and limiting movement of the back-pressure piston valve to the left. The strength of the spring 60 may be adjusted by the nut 61 and the stop 63 may be adjusted on the piston rod 52 to determine the initial or idle position of the control valve.

A branch pipe 70 connects the pipe 42 to the pipe 47 and thus forms a by-pass around the back-pressure control mechanism. This branch pipe or by-pass 70 is provided with a check valve 71 opening toward the main cylinder 12 but automatically closing to prevent flow in the opposite direction.

Having described the details of construction of my invention, the method of operation thereof is as follows:—

Assuming that the reversing valve is in the working position indicated in Fig. 1, fluid under pressure will be conducted through the pipe 15, cylinder 20 and pipe 30 to the right-hand end of the main cylinder 12, forcing the piston 10 to the left and forcing the oil in the left-hand end of the cylinder 12 out through the pipe 42.

It should be noted that the check valve 71 prevents any escape of oil at this time through the by-pass or branch pipe 70.

Oil discharged from the left-hand end of the cylinder 12 through the pipe 42 enters the cylinder 40 between the piston elements 50 and 51, thus exerting balanced pressures in both directions and having no tendency to move the piston valve.

The piston element 51, when in its initial or idle position indicated in Fig. 2, greatly restricts the flow through the triangular ports 45, and consequently a substantial back pressure is developed. This back pressure, however, causes a corresponding building-up of pressure in the pipe 30 and in the branch pipe 54 and also in the left-hand end portion of the control cylinder 40. This increased pressure causes the control piston valve to move to the right, compressing the spring 60. This valve movement increases the available opening through the ports 45, with a corresponding reduction in back pressure.

The parts quickly assume a balanced position, in which the ports 45 are open just enough to provide a substantial back pressure in the main cylinder 12, which pressure is maintained during the working stroke and is effective at even the slowest speeds.

At the end of the working stroke, the reversing valve assumes the position shown in Fig. 2, with the pipe 30 connected to the exhaust and consequently with no effective pressure in the branch pipe 54. The spring 60 thereupon expands, moving the control piston valve to the initial or idle position shown in Fig. 2. The pressure supply pipe 15 is now connected through the cylinder 20 to the pipe 47 and thus to the branch pipe or by-pass 70. Oil then flows freely through the by-pass 70 and check valve 71 to the left-hand end of the main cylinder 12, and a limited amount of additional oil also flows through the triangular ports 45 and cylinder 40 to the pipe 42, thus providing two paths of flow to the left-hand end of the cylinder 12.

As the piston rod 11 is also of substantial cross section and largely reduces the cylinder space at the left-hand side of the piston 10, the piston and reciprocated member will be returned to the right at relatively high speed on the idle or return stroke.

I have thus provided very simple mechanism for maintaining a substantial back pressure during the working stroke and for permitting free flow of oil to the main cylinder during the return stroke.

I have also provided means to vary the initial spring tension on the control valve and means to vary the initial port opening for said valve.

In actual operation, this mechanism has proved very successful and causes a slow moving member, such as a planer table, to travel with an exceptionally smooth and uniform motion. If tool resistance increases, pressure builds up behind the piston 10 and correspondingly in the pipe 54, thus moving the control valve further to the right and increasing the opening through the ports 45, with a resulting drop in back pressure. Consequently the tool resistance and the back pressure offset each other, one increasing when the other decreases, with a substantially equalized resultant load on the piston 10. The triangular ports offset the varying spring resistance and assist substantially in maintaining uniform operation.

Having thus described my invention and the advantages thereof, I do not wish to be limited to the details herein disclosed, otherwise than as set forth in the claims, but what I claim is:—

1. In a machine tool, a reciprocated member having a working and a return stroke, hydraulic actuating mechanism therefor including a cylinder and piston, a supply of fluid under pressure, a supply connection from said fluid supply to one end of said cylinder for a working stroke, a corresponding exhaust connection for the other end of said cylinder during said working stroke, a port in said exhaust connection, a back-pressure control valve for said port, a spring normally moving said valve toward port-closing position, and means to direct fluid under pressure from said supply connection against said valve in opposition to said spring, said valve being thereby rendered effective to uncover an increased area of said port in said exhaust connection on an increase in pressure in said supply connection, and to thereby decrease the back pressure in said exhaust connection in inverse proportion to the increase in resistance to movement of said reciprocated member by which the increase in pressure in the supply connection was occasioned.

2. In a machine tool, a reciprocated member having a working and a return stroke, hydraulic actuating mechanism therefor including a cylinder and piston, a supply of fluid under pressure, a supply connection from said fluid supply to one end of said cylinder for a working stroke, a corresponding exhaust connection for the other end of said cylinder during said working stroke, a port in said exhaust connection, a back-pressure control valve for said port, a spring normally moving said valve toward port-closing position, and means to direct fluid under pressure from said supply connection against said valve in opposition to said spring, said valve being thereby rendered effective to uncover an increased area of said port in said exhaust connection on an increase in pressure in said supply connection, and to thereby decrease the back pressure in said exhaust connection in inverse proportion to the increase in resistance to movement of said reciprocated member by which the increase in pressure in the supply connection was occasioned, said port in said exhaust connection being triangular and said back-pressure control valve variably and increasingly uncovering said triangular port from the apex toward the base thereof in response to increase in pressure in the supply connection.

KENNETH C. MONROE.